United States Patent
Sanghavi et al.

(10) Patent No.: US 8,706,808 B2
(45) Date of Patent: Apr. 22, 2014

(54) FOR DEFERRING INVITATIONAL CONTENT (75) Inventors: Mehul K. Sanghavi, Sunnyvale, CA (US); Michael Froimowitz Greenzeiger, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 13/300,450

(22) Filed: Nov. 18, 2011

(65) Prior Publication Data

US 2013/0132474 A1 May 23, 2013

(51) Int. Cl.
G06F 15/16 (2006.01)

(52) U.S. Cl.
USPC .......................................... 709/204

(58) Field of Classification Search
USPC .......................................... 709/204
See application file for complete search history.

(56) References Cited

U.S. PATENT DOCUMENTS

| 8,014,762 | B2 | 9/2011 | Chmaytelli et al. |
| 2010/0222042 | A1 | 9/2010 | Bosan et al. |
| 2010/0273447 | A1* | 10/2010 | Mann et al. .................. 455/405 |
| 2010/0274646 | A1 | 10/2010 | Townsend et al. |
| 2011/0055015 | A1 | 3/2011 | Gavita |
| 2011/0055135 | A1* | 3/2011 | Dawson et al. .................. 706/47 |

FOREIGN PATENT DOCUMENTS

WO 2009/099874 A2 8/2009

* cited by examiner

*Primary Examiner* — Larry Donaghue
*Assistant Examiner* — Marshall McLeod
(74) *Attorney, Agent, or Firm* — Novak Druce Connolly Bove + Quigg LLP (57) ABSTRACT

The present discloser relates to deferring invitational content. A content delivery system is configured to deliver invitational content to user terminals and can also provide a means to defer the invitational content until a condition has been met by providing a user interface element configured to terminate the content. The deferred content can be entered into a deferral queue. Conditions can be a set time or based on capabilities of the user terminal. The conditions can be set by the system or a user. The user can specify parameters through use of user interface elements. Deferral can be handled by the user terminal or a server. In addition content management systems can be configured to manage campaigns including tracking costs and impressions. When content is deferred, the initial impression is not fully counted; however, redelivery can be counted as an enhanced impression with a higher value.

29 Claims, 6 Drawing Sheets

FOR DEFERRING INVITATIONAL CONTENT

BACKGROUND

1. Technical Field

The present disclosure relates to invitational content and more specifically to deferring invitational content.

2. Introduction

Modern technology has made sharing information with a user easier than ever. With cellular phones becoming more like small personal computers, and wireless and cellular internet connections connecting computing devices from almost any location, content can be sent directly to a person at most any time. Sending invitational content is no longer limited to when a person is relaxing watching television, listening to the radio, or reading the paper. Computers and mobile computing devices are a constant part of our everyday life and are available when we are doing a wide variety of activities from having dinner with friends to working our daily jobs.

This increased direct access has been very attractive to content providers. Many spend considerable resources on organizing campaigns to deliver invitational content through these new channels. One problem with being able to access people at all times and at all places is that people can be accessed when they are too busy to view the invitational content or in a situation which makes viewing the invitational content inconvenient. Content providers are thus being charged for delivered content which cannot be viewed by the recipient and people are being delivered content that, although may interest them, they are unable to view. Accordingly, the present invention addresses these issues.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims.

Disclosed are devices, systems, methods, and non-transitory computer-readable storage media for deferring invitational content. Invitational content can often times be delivered by a content delivery system configured to retrieve and manage the content from content providers. In addition to delivering the invitational content, the present technology can allow a user to defer an action elicited by the invitational content. In some embodiments the user is provided with a means to defer the invitational content until some condition has been met. In some embodiments, users can be provided with a user interface element such as a graphical user interface button which is configured to defer the content. Upon deferral of an action elicited by the invitational content, the invitational content can be entered into a deferral queue whereupon it will not be represented until the condition has been met.

The condition upon which a deferral is based can be any one or more of a plurality of potential factors such as, but not limited to time, connectivity of devices, characteristics of devices, features of devices, etc. In some embodiments the condition can be set to allow the user to view the invitational content at a more convenient time. For example, a condition that 20 minutes pass from when the invitational content was deferred allows the user to finish doing any task that may make viewing the invitational content inconvenient. In another example, a user may have a preference to view the invitational content on a different device, such as one with a larger viewing area. In another example, a user might not want to download the full invitational content over a cellular connection, and would be more likely to view the invitational content when connected to a Wi-Fi network. In yet another example, a user may defer invitational content that is not compatible with a device's capabilities such as when the content includes a game that makes use of a gyroscope, but the user in on a laptop that does not include a gyroscope. Each of these are merely examples of when a user might defer invitational content and the conditions that are associated with those examples. However, it should be appreciated that any reason for deferring content and the condition upon which the reason is based is included within the scope of this technology and disclosure.

The conditions can be set by the system or alternatively, a user can set the conditions before, or upon deferring an item of invitational content. In some embodiments a user can be presented with multiple user interface elements to specify the parameters of the deferral. For example, in some embodiments a user can specify whether only the one item of invitational content should be deferred or that all items of invitational content should be deferred until a condition is met.

As will be appreciated by those of ordinary skill in the field of invitational content delivery, deferral of invitational content items can also affect other aspects of a content delivery service. Invitational content can be configured to elicit an invited response from a user such an impression, or a conversion, or other interaction. These invited responses can be associated with a value, but when the invited response is deferred it can be necessary to revalue the invited response. For example, a content delivery service can be required to track how many impressions an item of targeted content receives over a period of time. If the item of targeted content is deferred, it might not have received a user's full attention, and thus it should be valued differently. It can be that a deferral should be associated with no value, because the impression was deferred until later, or a deferral can be considered a partial impression and given a partial value. When the deferral criteria have been met, and the invitational content is represented to the user, the impression can be associated with a greater or lesser value than its original value.

In another example, a value can be associated with an invited conversion action. When the conversion is deferred, the value associated with the conversion action can be adjusted to reflect that the content was deferred. In some embodiments, when invitational content is deferred it can be considered an indication of user interest because they didn't just ignore the invitational content, and therefore that user can be considered more likely to provide the elicited response.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
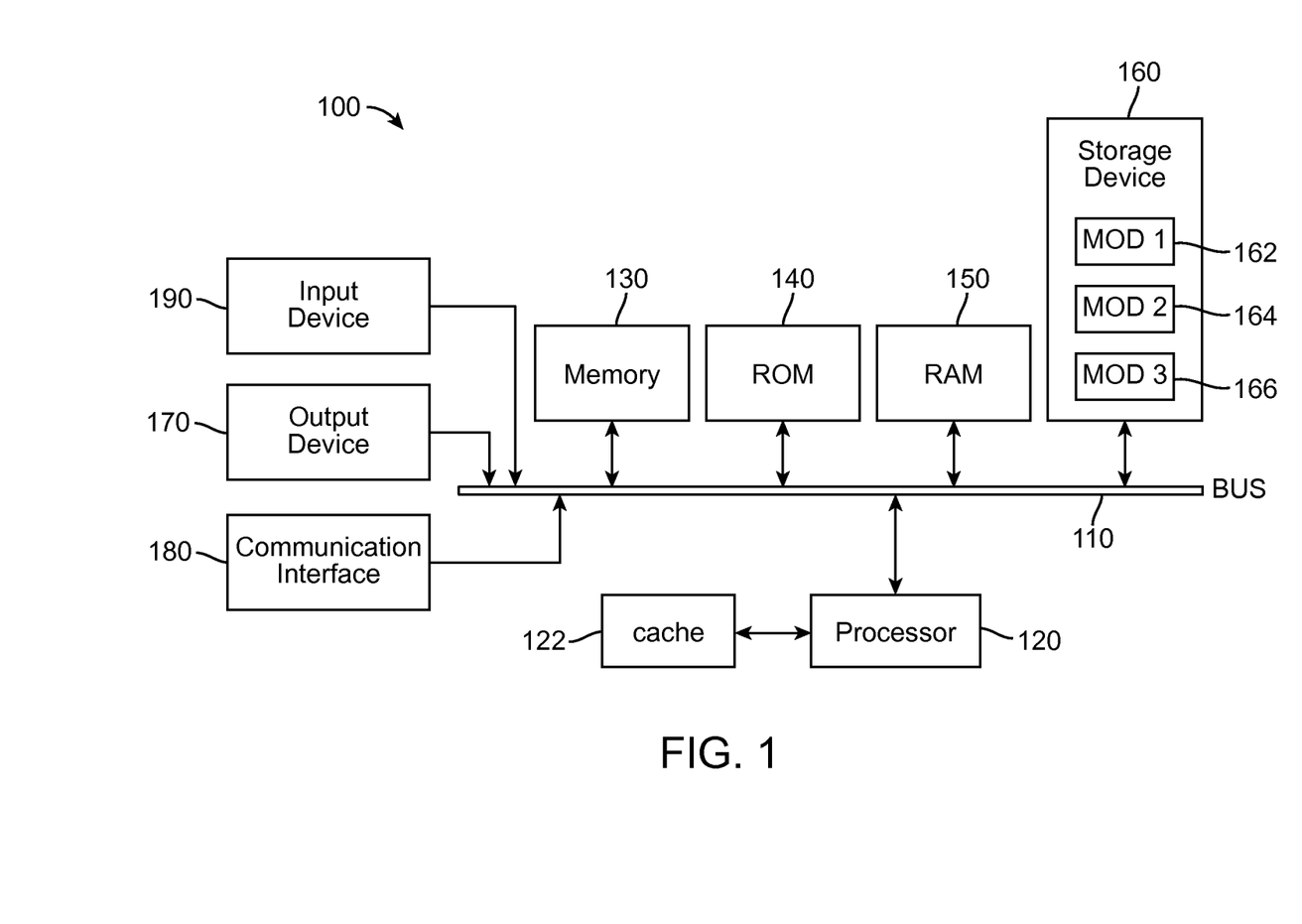
FIG. 1 illustrates an example system embodiment.

FIG. 1 illustrates an exemplary system 100 that includes a general-purpose computing device 100, including a processing unit (CPU or processor) 120 and a system bus 110 that couples various system components including the system memory 130, such as read only memory (ROM) 140, and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166, which are modules configured to control the processor 120. These modules may be stored on the storage device 160 and loaded into RAM 150 or memory 130 at runtime or may be stored as would be known in the art in other computer-readable memory locations.

Figure 2:
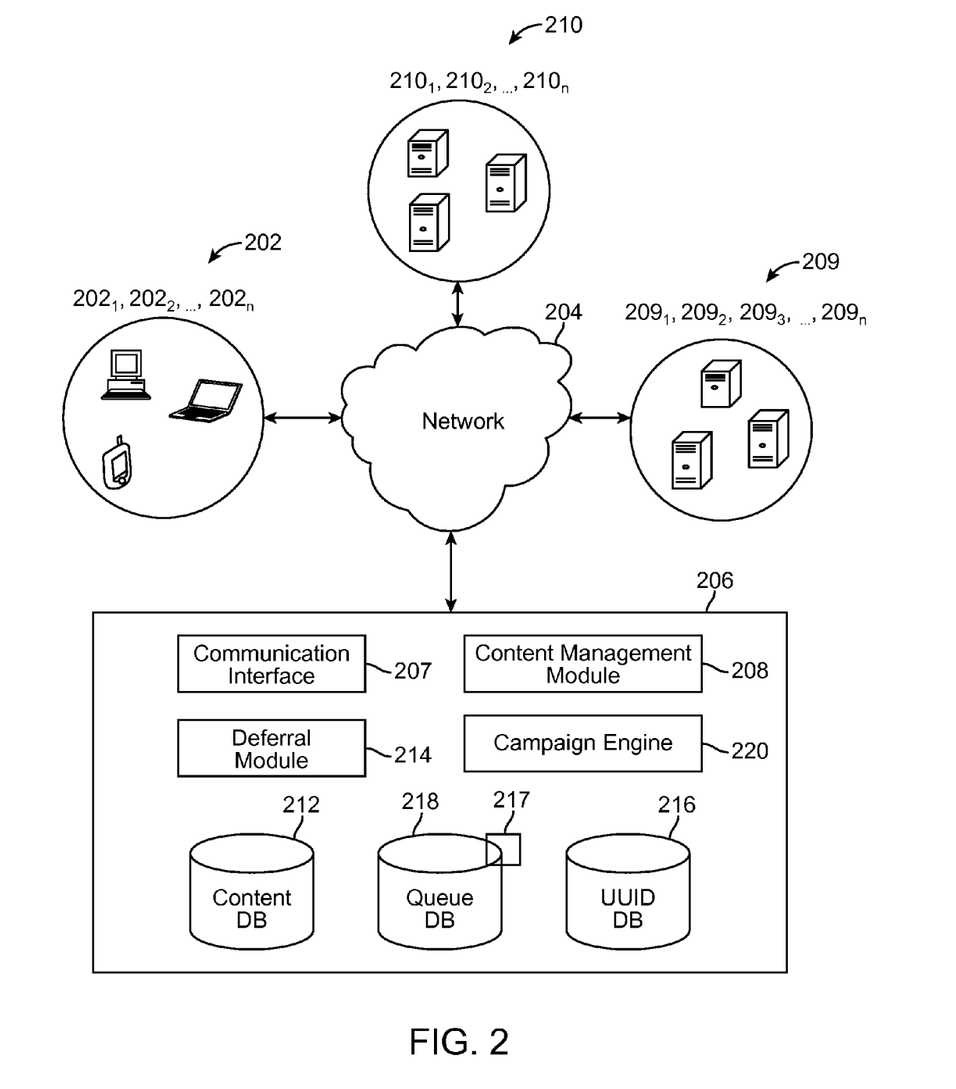
FIG. 2 illustrates an exemplary system configuration wherein electronic devices communicate via a network for purposes of exchanging content and other data.

Having disclosed some components of a computing system, the disclosure now turns to FIG. 2, which illustrates an exemplary system configuration 200, wherein electronic devices communicate via a network for purposes of exchanging content and other data. The system can be configured for use on a network as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, invitational content is delivered to user terminals $202_1 \ldots 202_n$ (collectively "202") connected to a network 204 by direct and/or indirect communications with a content delivery system 206. In particular, the content delivery system 206 receives a request for a content package of electronic-invitational content, such as a web page, an application, a game, or media, etc., from one of user terminals 202. In the various embodiments, one or more types of invitational content can be combined in a content package. The user terminal 202 can be configured to render the received invitational content. This can include display or playing the invitational content appropriately depending on the form of the invitational content. For example, the invitational content can include text, graphics, audio, video, executable code or any combination thereof. Upon successfully rendering the delivered invitational content, the user terminal 202 can be configured to send a notification to the content delivery system 206. In some embodiments the notification can be a web beacon such as an embedded tracking pixel. In some embodiments, the invitational content can be associated with a product or can directly or indirectly advertise a product. In some embodiments, the content package can be configured to replace or update invitational content in a content package already delivered to the user terminal.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 206 selects the invitational content in response to the request and transmits the assembled invitational content to the requesting one of user terminals 202. In some embodiments, the server has preselected the invitational content before the request is received. Thereafter, the server assembles a content package of invitational content and causes the content package to be delivered to the user. The content delivery system can include a communications interface 207 to facilitate communications with the user terminals 202 and any other components familiar to those of ordinary skill in the art.

The content delivery system 206 includes a content management module 208 that facilitates generation of the assembled content package, which can include invitational content. Specifically, the content management module can combine content from one or more primary content providers $209_1 \ldots 209_n$ (collectively "209") and content from one or more invitational content providers $210_1 \ldots 210_n$ (collectively "210") to generate the assembled content package for the user terminals 202. For example, in the case of a web page being delivered to a requesting one of user terminals 202, the content management module 208 can assemble a content package by requesting the data for the web page from one of the primary content providers 209 maintaining the web page. For the invitational content on the web page provided by the invitational content providers 210, the content management module 208 can request the appropriate data according to the arrangement between the primary and invitational content providers 209 and 210. In some embodiments, device 202 can directly request or already have access to primary content from primary content provider 209. In such embodiments, device 202 can further request invitational content from system 206. System 206 can identify and deliver invitational content appropriate for association with primary content. For example, primary content such as an application can already reside or be running of a device 202, and primary content can direct device 202 to request invitational content from system 206 to be associated with primary content on device 202.

Although primary and invitational content providers 209 and 210 are presented herein as separate entities, this is for illustrative purposes only. In some cases, the primary and invitational content providers 209 and 210 can be the same entity. Thus, a single entity can define and provide both the primary and the invitational content.

Although the content management module 208 can be configured to request that content be sent directly from content providers 209 and 210, a cached arrangement can also be used to improve performance of the content delivery system 206 and improve overall user experience. That is, the content delivery system 206 can include a content database 212 for locally storing/caching content maintained by content providers 209 and 210. The data in the content database 212 can be refreshed or updated on a regular basis to ensure that the content in the database 212 is up-to-date at the time of a request from a user terminal. However, in some cases, the content management module 208 can be configured to retrieve content directly from content providers 209 and 210 if the metadata associated with the data in content database 212 appears to be outdated or corrupted.

In the various embodiments, the content delivery system 206 can also include a unique user identifier (UUID) database 216 that can be used for managing sessions with the various user terminal devices 202. The UUID database 216 can be used with a variety of session management techniques. For example, the content delivery system 206 can implement an HTTP cookie or any other conventional session management method (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of handheld communications devices, such as mobile phones, smart phones, tablets, or other types of user terminals connecting using multiple or non-persistent network sessions, multiple requests for content from such devices may be assigned to a same entry in the UUID database 216. The delivery system 206 can analyze the attributes of requesting devices to determine whether such requests can be attributed to the same user. Such attributes can include device or group-specific attributes.

In addition to delivering invitational content, the content delivery system 206 can also include a deferral module 214. The deferral module 214 can be configured to provide the user with a means to defer the invitational content until a condition is met. For example, a user may be interested in the invitational content that has been delivered to their user terminal 202, however the user may wish to defer viewing the invitational content until a more convenient time or until the user is using a different device or is connected to a different network with greater bandwidth. To achieve this, the deferral module 214 can provide a user interface element such as a graphical user interface (GUI) button which can be configured to defer the invitational content when selected.

Figure 3:
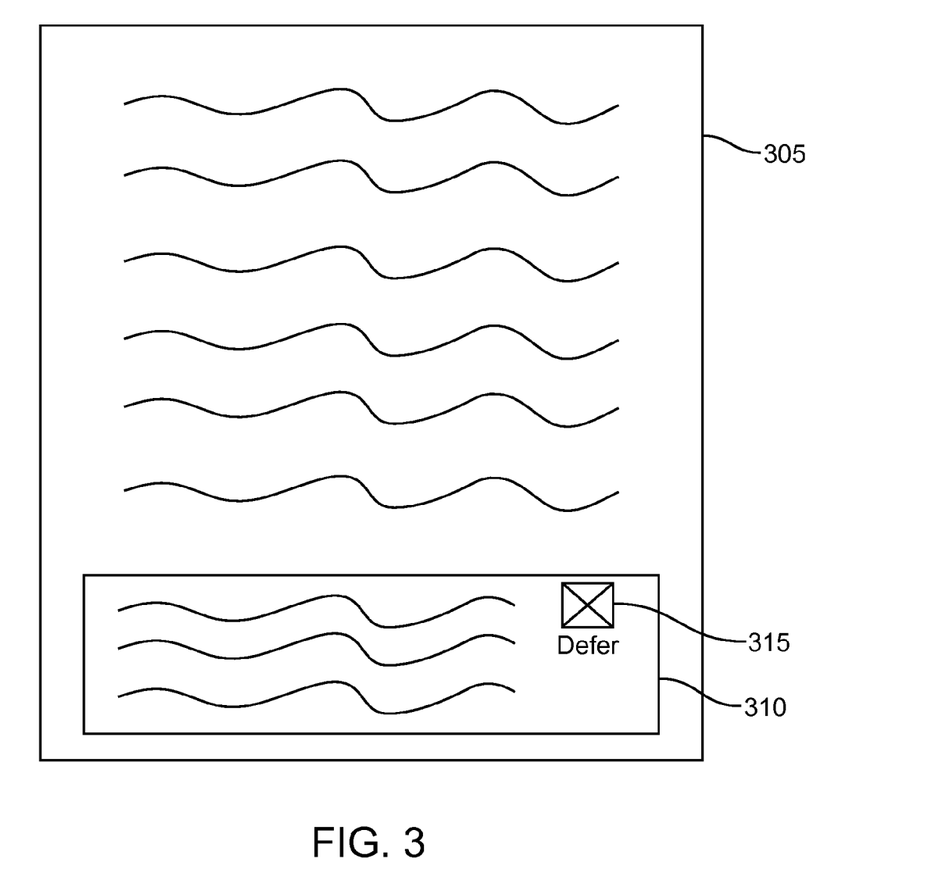
FIG. 3 illustrates an exemplary embodiment of invitational content with a user interface element.

FIG. 3 illustrates an exemplary embodiment of invitational content with a user interface element. As illustrated, a webpage 305 can include invitational content 310 in the form of a banner advertisement. The invitational content 310 can include a user interface element 315, which in this case is a button displayed at the top right corner of the invitational content. A user can defer the invitational content 310 by clicking the button 315.

Returning to FIG. 2, in some embodiments, deferring the invitational content can include terminating the invitational content along with sending a deferral notification to the content delivery system 206. The deferral notification can contain data indicating that the user has deferred the invitational content as well as data indicating which invitational content the user would like to defer and the UUID.

Upon receiving a deferral notification, the deferral module 214 can enter the invitational content into a deferral queue 217 to be delivered later. A deferral queue 217 can be a data structure configured to store data. In some embodiments the content delivery system 206 can include a queue database 218 configured to store multiple deferral queues 217. As illustrated, the queue database 218 is a separate database, however, in some embodiments the queue database 218 can be a part of the content database 212.

When entering the invitational content into the deferral queue 217, the deferral module 214 can enter either a portion of or all of the deferred invitational content. Alternatively, in some embodiments, an identifier identifying the invitational content can be stored in the deferral queue 217. In addition to entering the deferred invitational content into the deferral queue 217, the deferral module 214 can also associate the UUID with the deferral queue 217. The content delivery system can be configured to not re-send any invitational content in a deferral queue 217 to the UUID associated with the deferral queue 217 until a condition is met. This can ensure that deferred invitational content will not be redelivered to user before the condition is met.

In some embodiments, upon receiving a deferral notification, the content delivery system 206 can cease delivery of all further invitational content to the user terminal 202 until a condition is met. For example, if a user has deferred an item of invitational content because it was delivered at an inconvenient time, there would be no benefit in delivering a different item of invitational content until it is determined that it is a convenient time. Accordingly, in some embodiments, the deferral module 214 can add the UUID to an exclusion list of UUIDs that should not have invitational content delivered to them. Alternatively, the deferral module 214 can flag the UUID in the UUID database 216 as being excluded.

The deferral module 214 can be configured to deliver the invitational content entered into a deferral queue 217 to the user terminal 202 upon a condition being met. Conditions can relate to time (delay for a period, or until a specified time, etc.), connectivity of devices (3G, Wi-Fi, etc.), characteristics of devices (laptop, smartphone, etc.), features of devices (GPS, accelerometer, etc.), location (home, work, etc.), or other possible factors. In some embodiments the condition can be set to allow the user to view the invitational content at a more convenient time. For example, a condition that 20 minutes pass from when the invitational content was deferred allows the user to finish doing any task that may make viewing the invitational content inconvenient.

In some embodiments the condition can be receiving an indication from the user that they are ready to view the invitational content. In this type of embodiment, the deferral module 214 can provide a second user interface element to the user upon the invitational content being deferred, the second user interface element being configured to send a notification to the content management device upon the user indicating that they are ready to view the invitational content. The second user interface element can be located in any number of places. For example, in some embodiments the second user interface can be located in a corner to minimize distraction to the user. In some embodiments the second user interface element can be located where the deferred invitational content would have been had it not been deferred.

In some embodiments, the condition can be set to allow the user to view the invitational content in a more convenient computing environment. For example, a condition can be that the user terminal meets certain minimum requirements. In some embodiments, the minimum condition can be associated with network connection so that a user receiving content on a cellular phone using 3G can defer until they are connected via Wi-Fi. In some embodiments the minimum condition can be associated with the type of device so that a user receiving content on a cellular phone can defer until they are using a computer with greater processor speed, display size, or resolution. These are just examples of possible conditions and are not meant to be limiting, any condition which can be employed by a person skilled in the art can be used.

In some embodiments there can be multiple conditions. For example, the conditions can be that the user be using a Wi-Fi network and that 3 hours has passed since the user deferred the invitational content. In some embodiments, the method can be configured so that the condition is met when one of the multiple conditions is met. For example, the condition would be met if either the user is connected to a Wi-Fi connection or 3 hours has passed since the user deferred the invitational content. Alternatively, in some embodiments both conditions must be met. The user, therefore, would have to both be connected to a Wi-Fi network and three hours had passed since the user deferred the invitational content.

To determine whether conditions based on the status of the user terminal 202 have been met, in some embodiments, the deferral module 214 can be configured to communicate with the user terminal periodically to request a status. Alternatively, in some embodiments, the deferral module 214 can determine whether the condition has been met upon receiving a request for invitational content from the user terminal.

When the deferral module 214 has determined that a condition has been met, the deferral module 214 can redeliver the deferred invitational content to the user terminal 202. The invitational content can be retrieved from the deferral queue 217 by the content management module 208 and the invitational content can be delivered. Further, the deferral module 207 can remove the redelivered invitational content from the deferral queue 217 and remove the UDID from the exclusion list.

Although the deferral module 214 is illustrated as being a part of the content management system 206, this is only one exemplary embodiment. In some embodiments the deferral module 214 can be running on the user terminal.

Figure 4:
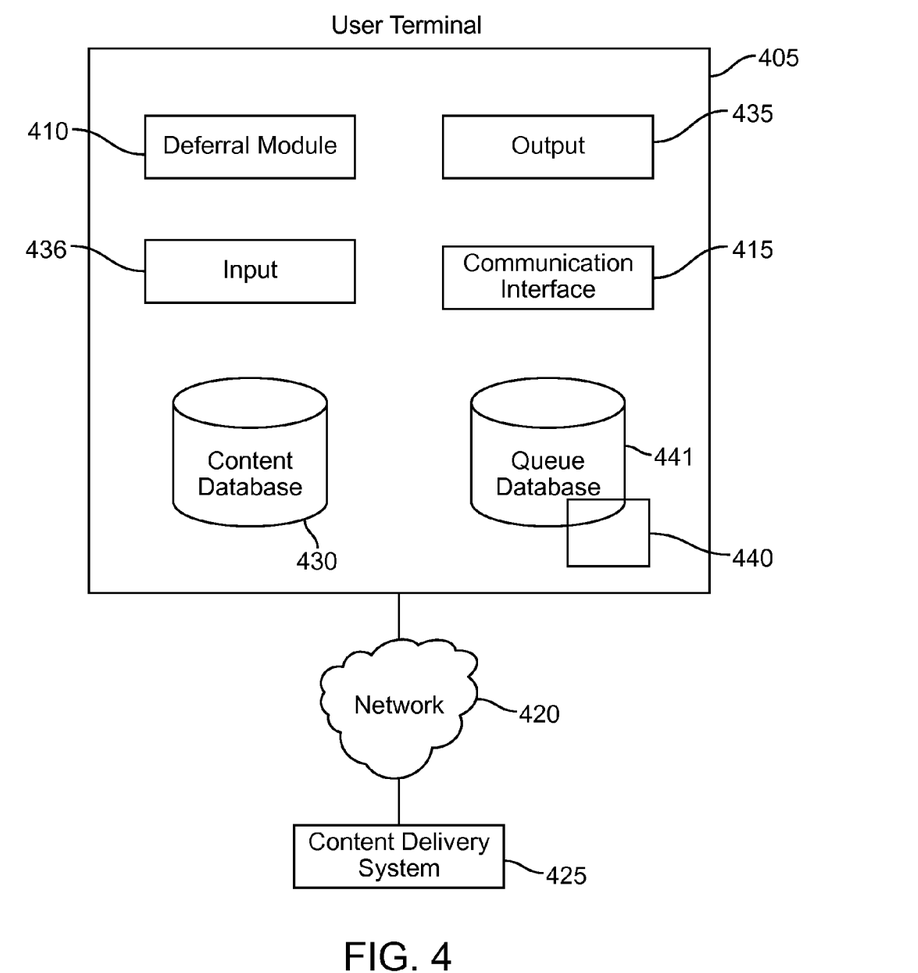
FIG. 4 illustrates an exemplary system embodiment of a user terminal running the deferral module.

FIG. 4 illustrates an exemplary system embodiment of a user terminal 405 running the deferral module 410. The user terminal 405 can be a general purpose computing device similar to the one disclosed in FIG. 1, such as a personal computer (PC), tablet PC, laptop, cellular phone, etc. As illustrated, the user terminal 405 can include a communication interface 415 in network connection 420 with a content delivery system 425.

The user terminal 405 can be configured to request invitational content from the content delivery system 425. In some embodiments the content is requested from the content delivery system 425 each time it is to be displayed at the user terminal 405. Alternatively, the user terminal 405 can include a content database 430 for locally storing/caching invitational content. The data in the content database 430 can be refreshed or updated on a regular basis to ensure that the content in the database is up-to-date at the time the invitational content is to be displayed. The requested invitational content can be provided to the user by use of the output 435 of the user terminal 405. The output can include any type of output means such as a monitor, speakers, etc.

The user terminal 405 can also include a deferral module 410 configured to allow a user to defer the provided invitational content. The deferral module can provide a user interface element along with the invitational content. A user can use the input 436 to interact with the user interface element. The input 436 can include any type of input such as a keyboard, touch screen, mouse, microphone, etc.

The user interface element can be configured to defer the invitational content including terminating the invitational content and entering the invitational content in a deferral queue 440. The deferral queue 440 can be located in a queue database 441. As illustrated the queue database 441 is located on the user terminal 405; however the queue database 441 can be located on another computing device or server in network communication with the user terminal 405. Although the queue database 441 is illustrated as a separate database, it can also be a part of another database. For example, in some embodiments the queue database 441 can be a part of the content database 430. In some embodiments, the queue database 441 can be a part of a database associated with another application running in the user terminal. The deferral module 410 can also be configured to prevent the deferred invitational content from being provided to the user terminal until 405 a condition has been met. For example, in some embodiments the deferral module 410 can be configured to cease requests for invitational content originating from the user terminal.

The deferral module 410 can also be configured to monitor whether a condition has been met. Upon a condition being met, the deferral module 410 can deliver the invitational content stored in the deferral queue 440.

Returning to FIG. 2, in some embodiments the content delivery system 206 can also include a campaign engine 220 which can be configured to fulfill campaigns for content providers 210 by managing inventory and pricing of invitational content delivered to user terminals 202. Content providers 210 can arrange to have their invitational content delivered by the content delivery system 206 based on a pricing scheme. The pricing scheme can be based on eliciting a specified user response. For example, in some embodiments the pricing scheme can be arranged so that a content provider 210 is charged a set price for eliciting a user response of viewing the invitation content. A user viewing the invitational content can be measured as an invitational content impression. An impression can be counted as every time an item of invitational content is displayed at the user terminal 202 for at least a predetermined amount of time. For example, if the invitational content is a banner advertisement, an impression can be counted if the banner advertisement is displayed on a user terminal 202 for 3 seconds. In some embodiments the predetermined time can vary according to the invitational content. For example, the invitational content can be a video and so an impression can be counted upon completion of the video.

In some embodiments, the pricing scheme can be based on eliciting a user response to invitational content. For example, a campaign can charge for each conversion associated with delivered invitational content. A conversion can be counted in many ways, for example, in some embodiments a conversion can be counted when a user clicks on a banner advertisement and is forwarded to additional content. In some embodiments a conversion can be counted when a user purchases a product advertised by the invitational content. Although impression and conversion are used as examples, any pricing scheme or combination of can be used.

A content provider 210 can arrange a campaign in any number of ways. In some embodiments a content provider 210 can choose a maximum cost limit for a period of time. For example a campaign can be configured so that the cost of delivering the invitational content does not exceed $10,000 over a month. In some embodiments the campaign can be configured to have a price limit over a time interval as well as another limit for a smaller time period. For example, a campaign can be allocated $10,000 over a month, but not to exceed $500 in any given day. Campaigns can also be configured to have a minimum amount to be spent per a certain time period. For example, a campaign can have a daily max of $1,000 per day as well as a minimum of $950 per day. These examples are not meant to be limiting, campaigns can be configured in any number of ways known in the art.

The campaign engine 220 can be arranged to manage the delivery of the invitational content based on the parameters of the campaign. For example, if a content provider 210 has arranged a maximum limit of $1,000 per day, the campaign engine 220 can monitor the number of impressions and conversions, and upon the limit being reached, no longer deliver the item of invitational content. Ensuring that the maximum limit is not exceeded can be important because in some embodiments the content provider 210 is not liable to pay more than the maximum limit per day and so any impression or conversion above the limit would be free of charge to the content provider 210.

Deferred invitational content poses unique challenges when managing a campaign. For example, a content provider 210 may not be willing to consider the delivery of an item of invitational content to be an impression if it is deferred, preferring to only consider it an impression after a condition has been met and the invitational content has been re-delivered to the user. The content delivery system 206, therefore, has to deliver the invitational content twice to be counted as one impression. Further, deferred invitational content may never be redelivered and so never counted as an impression even though it has already been delivered once. Another challenge is with managing the inventory of a campaign. For example, if a campaign is configured to have a daily maximum and minimum price, the campaign engine 220 can be configured to ensure that the minimum price is met while not exceeding the maximum. This task becomes much more difficult when pricing metrics and inventory are not handled in real time due to deferral. For example, if a user defers an item of invitational content and before the condition is met the campaign reaches its max limit, the content provider will not be liable for the cost of redelivering the invitational content to the user.

The campaign engine 220 can be configured to handle deferred invitational content in different ways to take into consideration these concerns. For example, in some embodiments the initial impression of the deferred invitational content, while delivered, is not fully counted since the user has elected to see it later. The not fully counted impression can have a lower cost associated to it than a non-deferred impression. A user deferring an item of invitational content, however, can signify greater user interest and so the second impression of the invitational content can be associated with a greater cost than a regular impression.

In some embodiments, a deferral can be limited in duration. The duration can be tied to campaign restraints. For example, a deferral might have a maximum duration of a set period of time, or a deferral might be required to expire at the end of a day, or after a time in which the user is expected to be home, or after a period of days, but less than the maximum length of the campaign for delivering the invitational content. For example, a campaign to deliver invitational content might have a cap on the number of copies that can be delivered in a given day. In such instance, the campaign engine can limit the deferral period to expire in the evening so that the deferring user must either review the invitational content or that copy can be distributed to another user.

In another example, the deferral can extend beyond a day or even a week, but expires before the full campaign terminates. The campaign engine could then disregard the deferral on a daily basis, but would be able to retarget a user before the end of the campaign in hopes of gaining the elicited user action.

Figure 5:
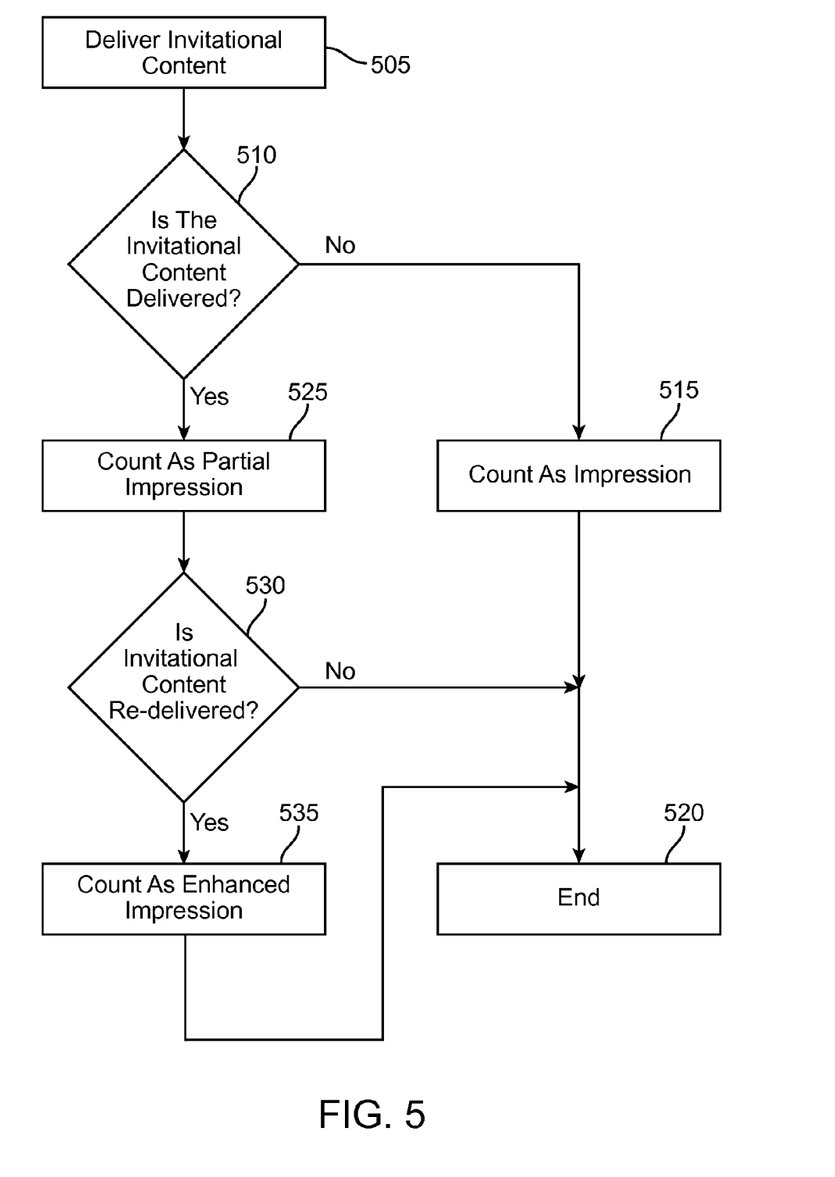
FIG. 5 illustrates an exemplary method embodiment of counting impressions associated with deferred invitational content.

FIG. 5 illustrates an exemplary method embodiment of counting impressions associated with deferred invitational content. As illustrated, invitational content can be delivered to a user terminal 505. The method then determines whether the invitational content has been deferred 510. If the invitational content has not been deferred and a predetermined amount of time passed, the delivered invitational content is counted as a regular impression 515 and the method ends 520. If the invitational content is deferred 510, then it is counted as a partial impression 525. In some embodiments, a partial impression can be associated with a lower cost than a regular impression. In some embodiments a partial impression can be associated with no cost, and is counted only for reporting and inventory purposes. The method next determines whether the invitational content is redelivered 530 to the user terminal. If the invitational content is redelivered 530, the invitational content is counted as an enhanced impression 535. An enhanced impression can be associated with a cost higher than a regular impression.

Figure 6:
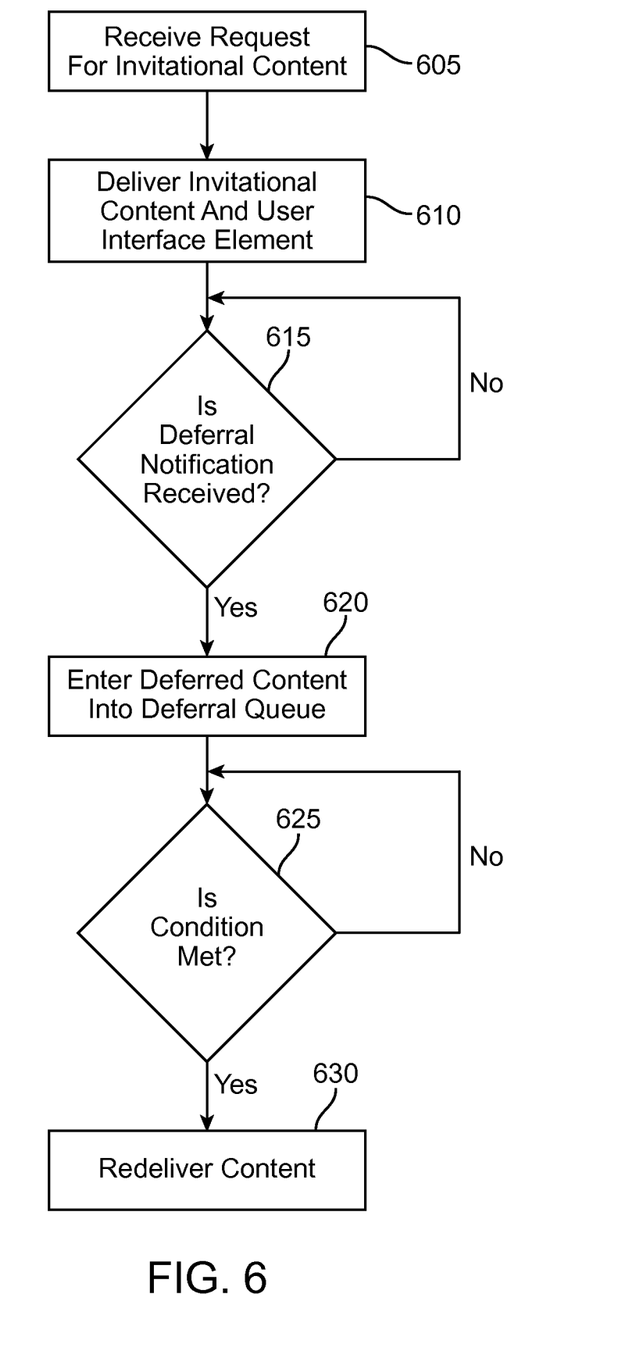
FIG. 6 illustrates an exemplary method embodiment of deferring invitational content wherein the user defines the condition.

FIG. 6 illustrates an exemplary method embodiment of deferring invitational content wherein the user defines the condition. At step 605 the content delivery system receives a request for invitational content from a user terminal. At step 610 the content delivery system can deliver to the user terminal an item of invitation content as well as a user interface element. The user interface element, as described above, can be any type of computing device allowing a user to input. For example, in some embodiments the user interface element can be a graphical user interface button.

In some embodiments multiple user interface elements can be provided to the user terminal. The multiple user interface elements can be configured in any way to receive numerous types of input from the user. For example, in some embodiments the user interface elements can be configured to provide the user with numerous deferral options so that the user can select deferral parameters. In some embodiments the user can be presented with two buttons, one to defer just the presented item of invitational content, the other to defer all invitational content. Further, in some embodiments the user can be prompted to choose the conditions of the deferral. For example, the user can choose between 5, 10, or 20 minutes, or until the user is connected to an internet connection with greater bandwidth. The user interface element can be configured to receive any combination of parameters from the user.

At 615 the method determines whether a deferral notification has been received. As disclosed above, the user interface element can be configured to send a deferral notification upon a user selection. If received the deferral parameters chosen by the user can be sent back as part of the notification. The method, at 620, then enters the deferred invitational content into the deferral queue. The deferral parameters can also be stored. In some embodiments the deferral parameters can be stored in the deferral queue with the invitational content to which they are associated. In this way the conditions associated with the deferred invitational content and the invitational content are stored at the same place. In some embodiments the conditions can be stored separately.

Once the invitational content is entered into the deferral queue, at 625 the method determines whether one of the conditions has been met. If it has been met, at 630, the invitational content is redelivered to the user terminal.

In some embodiments, an item of content that has been deferred might not be available for re-presentation to the user if the condition on which the deferral is based is satisfied after the invitational content has reached a campaign limit. In such embodiments, the content management system can determine that the deferred content has expired and select another item of invitational content for delivery to the user terminal.

In some embodiments, a deferral can be recorded by the content delivery system, and used to inform decisions for selecting additional invitational content to be delivered to a user. Since a deferral can be considered an indication of interest in the invitational content, the content management system can attempt to select invitational content similar to the deferred invitational content.

In some embodiments, there may be a limited number of deferrals that can be made by a user, as identified by his UUID. This can prevent a user from abusing deferrals to avoid seeing the invitational content. In some embodiments the limit can be tied to a particular item of invitational content.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
   delivering, by a content delivery service, an item of invitational content to a user terminal, the item of invitational content being configured to elicit a user response from a user associated with the user terminal, the item of invitational content being also configured to receive a request from the user to generate a deferral notification comprising an indication that the user has deferred a redelivery of the item of invitational content until a condition has been met;
   receiving the deferral notification at the content delivery service; and
   in response to receiving the deferral notification, deferring the redelivery of the item of invitational content until the condition has been met.

2. The computer-implemented method of claim 1, wherein the user response is an impression, and wherein the deferral notification comprises an indication that an impression was deferred.

3. The computer-implemented method of claim 2, wherein the impression is associated with a value that is based on a determination that the impression is a deferred impression.

4. The computer-implemented method of claim 1, wherein the user response is a conversion action.

5. The computer-implemented method of claim 4, wherein the response is associated with a value, the value being based on a type of response and whether the response was deferred by the user.

6. The computer-implemented method of claim 1, further comprising, when the condition has been met, redelivering the item of invitational content to the user terminal.

7. The computer-implemented method of claim 6, wherein the deferral notification includes a unique identifier associated with the user.

8. The computer-implemented method of claim 7, further comprising associating multiple user terminals with a same unique identifier.

9. The computer-implemented method of claim 7, further comprising entering the unique identifier into an exclusion list, wherein no invitational content will be delivered to a respective user terminal associated with the unique identifier until the condition is satisfied.

10. The computer-implemented method of claim 7, wherein the condition is dependent on computing specifications associated with a respective user terminal associated with the unique identifier from which the user is currently engaged.

11. The computer-implemented method of claim 6, wherein the condition is a duration of time passing after receiving the deferral notification.

12. The computer-implemented method of claim 6, wherein the condition is dependent on a network connection associated with the user terminal.

13. A content management system comprising:
   a processor; and
   a computer-readable storage medium having stored therein instructions which, when executed by the processor, cause the processor to perform operations comprising:
      delivering an item of invitational content to a user terminal, the item of invitational content being configured to elicit a user response from a user associated with the user terminal, the item of invitational content being also configured to receive a request from the user to generate a deferral notification comprising an indication that the user has deferred a redelivery of the item of invitational content until a condition has been met;
      receiving the deferral notification; and
      in response to receiving the deferral notification, deferring the redelivery of the item of invitational content until the condition has been met.

14. The content management system of claim 13, wherein the user response is an impression, and wherein the deferral notification is an indication that the impression was deferred.

15. The content management system of claim 14, wherein the impression is associated with a value that is based on a determination that the impression is a deferred impression.

16. The content management system of claim 13, wherein the elicited first user response is a conversion action.

17. The content management system of claim 16, wherein the response is associated with a value, the value being based on a type of response and whether the response was deferred by the user.

18. The content management system of claim 13, the computer-readable storage medium having stored therein instructions which, when executed by the processor, result in operations further comprising, when the condition has been met, redelivering the item of invitational content to the user terminal.

19. The content management system of claim 18, wherein the deferral notification includes a unique identifier associated with the user.

20. The content management system of claim 19, the computer-readable storage medium having stored therein instructions which, when executed by the processor, result in operations further comprising storing the unique identifier.

21. The content management system of claim 20, the computer-readable storage medium having stored therein instructions which, when executed by the processor, result in operations further comprising associating multiple user terminals with a same unique identifier.

22. The content management system of claim 20, the computer-readable storage medium having stored therein instructions which, when executed by the processor, result in operations further comprising entering the unique identifier into an exclusion list, wherein no invitational content will be delivered to a respective user terminal associated with the unique identifier until the condition is satisfied.

23. The content management system of claim 19, wherein the condition is dependent on computing specifications of a respective user terminal associated with the unique identifier from which the user is currently engaged.

24. The content management system of claim 19, wherein the condition is a duration of time passing after receiving the deferral notification.

25. The content management system of claim 19, wherein the condition is dependent on a network connection associated with the user terminal.

26. A non-transitory computer-readable storage medium storing instructions which, when executed by a computing device, cause the computing device to perform operations comprising:
    delivering an item of invitational content to a user terminal, the item of invitational content being configured to receive a request from the user to generate a deferral notification comprising an indication that the user has deferred a redelivery of the item of invitational content until a condition has been met;
    receiving a first notification upon the item of invitational content being rendered by the user terminal;
    associating a first value to a successful delivery of the item of invitational content;
    receiving the deferral notification; and
    adjusting the first value to a second value in response to receiving the deferral notification, wherein the second value is associated with a deferred delivery of the item of invitational content.

27. The non-transitory computer-readable storage medium of claim 26, storing additional instructions which, when executed by the computing device, result in operations further comprising:
    re-delivering the item of invitational content upon the condition being met, wherein re-delivering the invitational content is associated with a third value.

28. The non-transitory computer-readable storage medium of claim 27, wherein the third value is higher than the first value.

29. The non-transitory computer-readable storage medium of claim 26, wherein the second value is lower than the first value.

* * * * *